United States Patent [19]

Gebhardt

[11] 4,049,036

[45] Sept. 20, 1977

[54] WINDSHIELD COVERS

[76] Inventor: Paul A. Gebhardt, 917 N. 11th St., Springfield, Ill. 62702

[21] Appl. No.: 711,415

[22] Filed: Aug. 3, 1976

[51] Int. Cl.² .............................................. B60J 11/00
[52] U.S. Cl. ................................................ 150/52 K
[58] Field of Search ................. 150/52 F, 52 R, 52 K; 296/100, 136

[56] References Cited

U.S. PATENT DOCUMENTS

| 1,971,395 | 8/1934 | Danner | 150/52 F |
| 2,608,942 | 9/1952 | Smith | 150/52 K |
| 3,910,330 | 10/1975 | Johnson et al. | 150/52 K |

FOREIGN PATENT DOCUMENTS

| 2,003,476 | 12/1969 | Germany | 150/52 R |
| 928,869 | 6/1963 | United Kingdom | 150/52 K |

Primary Examiner—William Price
Assistant Examiner—Joseph Man-Fu Moy
Attorney, Agent, or Firm—Allen D. Brufsky

[57] ABSTRACT

A vehicle window cover that includes a sheet of semi-flexible material having air spaces or interstices therein; the sheet generally contains a plurality of voids or recesses between two opposing layers; and straps or the like to affix the same to the vehicle window.

6 Claims, 3 Drawing Figures

U.S. Patent     Sept. 20, 1977     4,049,036
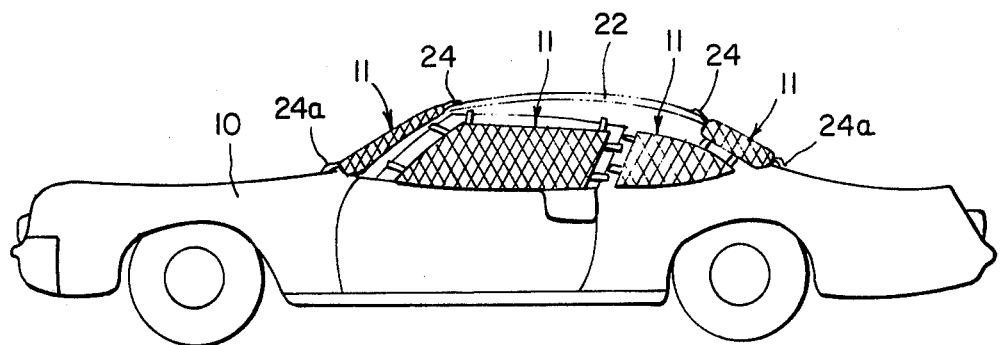
Fig. 1
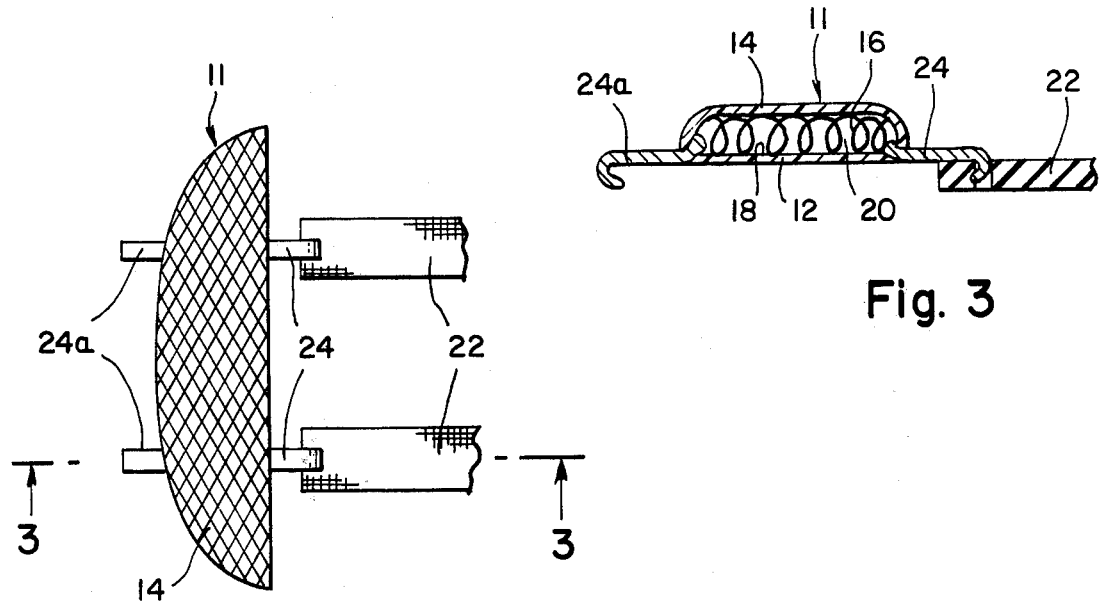
Fig. 2
Fig. 3

WINDSHIELD COVERS

BACKGROUND OF THE INVENTION

This invention relates to a vehicle window cover; more particularly to one adapted for use when the vehicle is exposed to the winter elements whereby frost and snow accumulate on the windows necessitating lengthy, time consuming and difficult scraping to remove the same. Most windshield covers are no more than flexible plastic sheets which themselves become frozen against the windshield where there is excessive cold and/or snow, due in part to the condensation which accumulates between the cover and the window.

The prior art teaches a variety of the foregoing covers, for example, as disclosed in U.S. Pat. Nos. 2,646,097; 2,718,912; 2,803,282; 2,874,709; 2,950,749; 3,222,102; 3,563,594; 3,763,908; 3,785,697; and others.

SUMMARY OF THE INVENTION

It is accordingly an object of the instant invention to provide for a new and improved vehicle window cover.

It is another object to provide for a cover that will reduce the tendency thereof to adhere to the window.

It is a further object to provide for the same at relatively little cost thereby making it generally available.

These and other objects and advantages of the invention will become more apparent from the following detailed disclosure and claims and by reference to the accompanying drawings, in which:

FIG. 1 is a side elevational view of the cover on a vehicle;

FIG. 2 is a plan view of the cover and fastening means; and

FIG. 3 is a sectional view taken along the line 3—3 of FIG. 2.

Broadly speaking, the instant invention includes the provision of a vehicle window cover, comprising a pair of sheets in opposing relation, the sheets joined about their ends forming a pocket, resilient means disposed in the pocket in spaced apart relation, the means defining a plurality of interstices, and a plurality of clip means engaging the pocket and adapted to affix the cover to the window.

DETAILED DISCLOSURE

Referring more particularly to the drawings there is shown a vehicle 10 such as a car, truck or the like, having a plurality of windows thereon. The instant cover 11 includes a first sheet member 12 such as of a liquid impermeable material (eg. plastic, latex, etc.) and a second sheet member 14 in substantial parallel relation, which can also be of the same material. The two sheets 12, 14 are joined along their peripheral edges thereby forming an envelope. A plurality of separating means 16 in spaced apart relation are disposed in the cavity 18 formed between the two opposing sheets 12, 14. The means 16 thereby forming a plurality of spaces or interstices 20 therebetween. In the preferred embodiment, the means 16 are formed of a flexible material, such as plastic or metal, more preferably a series of coil springs may be employed for this purpose; the means 16 being preferably communicating end to end from both sides of the cover 11. The interstices serve as insulating air pockets to prevent the sheet 12 from sticking to the adjacent window. The flexible yet substantial character of the springs prevent damage to the cover 11 as they can bear a substantial load of accumulated snow or the like. When the cover 11 is removed from a window by the pulling thereof, the springs handle the stress rather than the sheets 12 and 14. The cover 11 will be provided with a plurality of fastening straps 22 that are preferably elastic. In the preferred embodiment, at least one clip means 24 communicates with the strap 22, from one side of the cover 11. The opposite side of the cover 11 will have clips 24a thereon, these clips adapted to engage the opposite destal end (free end) of the strap 22. The strap 22 is removable from the clip 24, but may be needed where extra length is required to cover the window.

Since it is obvious that numerous changes and modifications can be made in the above-described details without departing from the spirit and nature of the invention, it is to be understood that all such changes and modifications are included within the scope of the invention.

I claim:

1. A vehicle window cover, comprising a pair of sheets in opposing relation, said sheets joined about their ends forming a pocket, resilient means disposed in said pocket in spaced apart relation, said means being a plurality of springs defining a plurality of interstices, and a plurality of clip means engaging said pocket and adapted to affix said cover to a window of a vehicle.

2. The cover as defined in claim 1, wherein said clip means communicate with the joined end of said cover.

3. The cover as defined in claim 1, wherein at least one of said sheets is liquid impermeable.

4. The cover as defined in claim 1, and elastic straps communicating with at least some of said clip means.

5. The cover as defined in claim 4, wherein said straps are removably attached to said clip means.

6. The cover as defined in claim 1, wherein said clip means have a hooked end.

* * * * *